United States Patent
Liu

(10) Patent No.: US 11,671,678 B2
(45) Date of Patent: Jun. 6, 2023

(54) METHOD AND DEVICE, EQUIPMENT, AND STORAGE MEDIUM FOR DATA PROCESSING

(71) Applicant: BEIJING BAIDU NETCOM SCIENCE AND TECHNOLOGY CO., LTD., Beijing (CN)

(72) Inventor: Hui Liu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/374,981

(22) Filed: Jul. 13, 2021

(65) Prior Publication Data

US 2021/0345009 A1   Nov. 4, 2021

Related U.S. Application Data

(63) Continuation of application No. PCT/CN2020/083597, filed on Apr. 7, 2020.

(30) Foreign Application Priority Data

Oct. 15, 2019   (CN) .......................... 201910980311.1

(51) Int. Cl.
*H04N 21/647* (2011.01)
*H04N 21/43* (2011.01)
*H04N 21/8352* (2011.01)

(52) U.S. Cl.
CPC ... *H04N 21/64784* (2013.01); *H04N 21/4307* (2013.01); *H04N 21/8352* (2013.01)

(58) Field of Classification Search
CPC .......... H04N 21/64784; H04N 21/8352; H04N 21/4307; H04N 21/21805; H04N 21/2365; H04N 21/4347; H04N 7/181
See application file for complete search history.

(56) References Cited

U.S. PATENT DOCUMENTS

| | | | | |
|---|---|---|---|---|
| 5,602,858 | A | * | 2/1997 | Kitaori ............. G11B 20/10009 714/795 |
| 10,044,987 | B1 | | 8/2018 | Curlander et al. |
| 2008/0060034 | A1 | | 3/2008 | Egnal et al. |
| 2009/0274365 | A1 | * | 11/2009 | Tsuda ................... H04N 19/423 382/166 |
| 2015/0264320 | A1 | | 9/2015 | Yuki |

(Continued)

FOREIGN PATENT DOCUMENTS

| | | |
|---|---|---|
| CN | 102480600 A | 5/2012 |
| CN | 103927364 A | 7/2014 |

(Continued)

*Primary Examiner* — Adil Ocak
(74) *Attorney, Agent, or Firm* — Mauriel Kapouytian Woods LLP; Wensheng Ma; Liang Huang

(57) ABSTRACT

A data processing method is provided. The method includes receiving a single aggregated data stream from a data aggregation device. The aggregated data stream includes multiple data packets captured by multiple video capture devices respectively, and each data packet has an identifier of the video capture device that captures the data packet. The method further includes determining multiple videos associated with the multiple video capture devices from the aggregated data stream based on the identifiers. Each video includes data packets with the same identifier.

15 Claims, 5 Drawing Sheets

(56) References Cited

U.S. PATENT DOCUMENTS

| | | | |
|---|---|---|---|
| 2016/0359760 A1 | 12/2016 | Vishnyakov | |
| 2017/0366591 A1* | 12/2017 | Thomas | H04N 21/8456 |
| 2018/0131844 A1* | 5/2018 | Lau | H04N 21/4302 |
| 2018/0328698 A1* | 11/2018 | Miller | F41C 27/00 |
| 2019/0228545 A1* | 7/2019 | Gan | G06T 11/003 |
| 2020/0195906 A1* | 6/2020 | Van Hoff | H04N 13/296 |

FOREIGN PATENT DOCUMENTS

| | | |
|---|---|---|
| CN | 105335387 A | 2/2016 |
| CN | 106162075 A | 11/2016 |
| CN | 106331673 A | 1/2017 |
| CN | 106454236 A | 2/2017 |
| CN | 106851183 A | 6/2017 |
| CN | 106878658 A | 6/2017 |
| CN | 108063746 A | 5/2018 |
| CN | 108200345 A | 6/2018 |
| CN | 108924477 A | 11/2018 |
| CN | 109937408 A | 6/2019 |
| CN | 109949203 A | 6/2019 |
| CN | 110278418 A | 9/2019 |
| CN | 110677623 A | 1/2020 |
| JP | H11164289 A | 6/1999 |
| JP | 2006-211213 A | 8/2006 |
| JP | 2006-310955 A | 11/2006 |
| JP | 2012100032 A | 5/2012 |
| JP | 2014176016 A | 9/2014 |
| JP | 2016171382 A | 9/2016 |
| WO | 2005027518 A1 | 3/2005 |

* cited by examiner

METHOD AND DEVICE, EQUIPMENT, AND STORAGE MEDIUM FOR DATA PROCESSING

CROSS REFERENCE TO RELATED APPLICATIONS

The present application is a continuation of International Application Number PCT/CN2020/083597 filed on Apr. 7, 2020 which claims the priority of the Chinese patent application 201910980311.1 filed on Oct. 15, 2019, the contents of which are hereby incorporated by reference in their entireties.

FIELD

The present disclosure relates to the field of data processing, in particular to a data processing method and device, equipment, and a computer-readable storage medium.

BACKGROUND

With the development of computer technology, more and more scenes need to capture and process videos. For example, the video capture and processing technology has an important application value in scenes such as vehicle assistant driving. Generally speaking, a vehicle can use sensors and video capture devices to sense the surrounding environment and collect various data during the driving process of the vehicle so as to achieve assistant driving.

Generally, video capture and processing devices are not flexible enough to control multiple video capture devices, and it is difficult to start and stop individual video capture devices. In addition, as the number of the video capture devices increases, these devices often require more hardware resources to transmit multiple videos, and the synchronization accuracy between these videos is low.

SUMMARY

According to embodiments of the present disclosure, a data processing solution is provided.

In an aspect of the present disclosure, a data processing method is provided. The method includes: receiving a single aggregated data stream from a data aggregation device, wherein the aggregated data stream includes multiple data packets captured by multiple video capture devices respectively, and each data packet has an identifier of the video capture device that captured the data packet. The method further includes: determining multiple videos associated with the multiple video capture devices from the aggregated data stream based on the identifiers, wherein each video includes data packets with the same identifier.

In an aspect of the present disclosure, a data processing device is provided. The device includes a data receiving module configured to receive a single aggregated data stream from a data aggregation device, the aggregated data stream includes multiple data packets captured by multiple video capture devices respectively, and each data packet has an identifier of the video capture device that captured the data packet. The device further includes a video determining module configured to determine multiple videos associated with the multiple video capture devices from the aggregated data stream based on the identifiers, and each video includes data packets with the same identifier.

In an aspect of the present disclosure, electronic equipment is provided, comprising: one or more processors; and a storage device storing one or more programs configured to be executed, by the one or more processors, the one or more programs including instructions for causing the electronic equipment to perform operations comprising: receiving a single aggregated data stream from a data aggregation device, wherein the single aggregated data stream includes multiple data packets captured by multiple video capture devices respectively, and wherein each data packet has an identifier of the video captured device that captures the data packet; and determining multiple videos associated with the multiple video capture devices from the single aggregated data stream based on the identifiers, wherein each video includes data packets with the same identifier.

In an aspect of the present disclosure, a non-transitory computer-readable storage medium that stores one or more programs comprising instructions that, when executed by one or more processors of an electronic equipment, cause the electronic equipment to implement operations comprising: receiving a single aggregated data stream from a data aggregation device, wherein the single aggregated data stream includes multiple data packets captured by multiple video capture devices respectively, and wherein each data packet has an identifier of the video capture device that captured the data packet; and determining multiple videos associated with the multiple video capture devices from the single aggregated data stream based on the identifiers, wherein each video includes data packets with the same identifier.

It should be understood that the content described in the summary section is not intended to limit the key or important features of the embodiments of the present disclosure, nor is it intended to limit the scope of the present disclosure. Other features of the present disclosure will become easy to understand through the following description.

BRIEF DESCRIPTION OF THE DRAWINGS

The above and other features, advantages and aspects of the embodiments of the present disclosure will become clearer in conjunction with the accompanying drawings and with reference to the following detailed description. The same or similar drawing symbols indicate the same or similar elements in the accompanying drawings, wherein.

DETAILED DESCRIPTION

Figure 1:
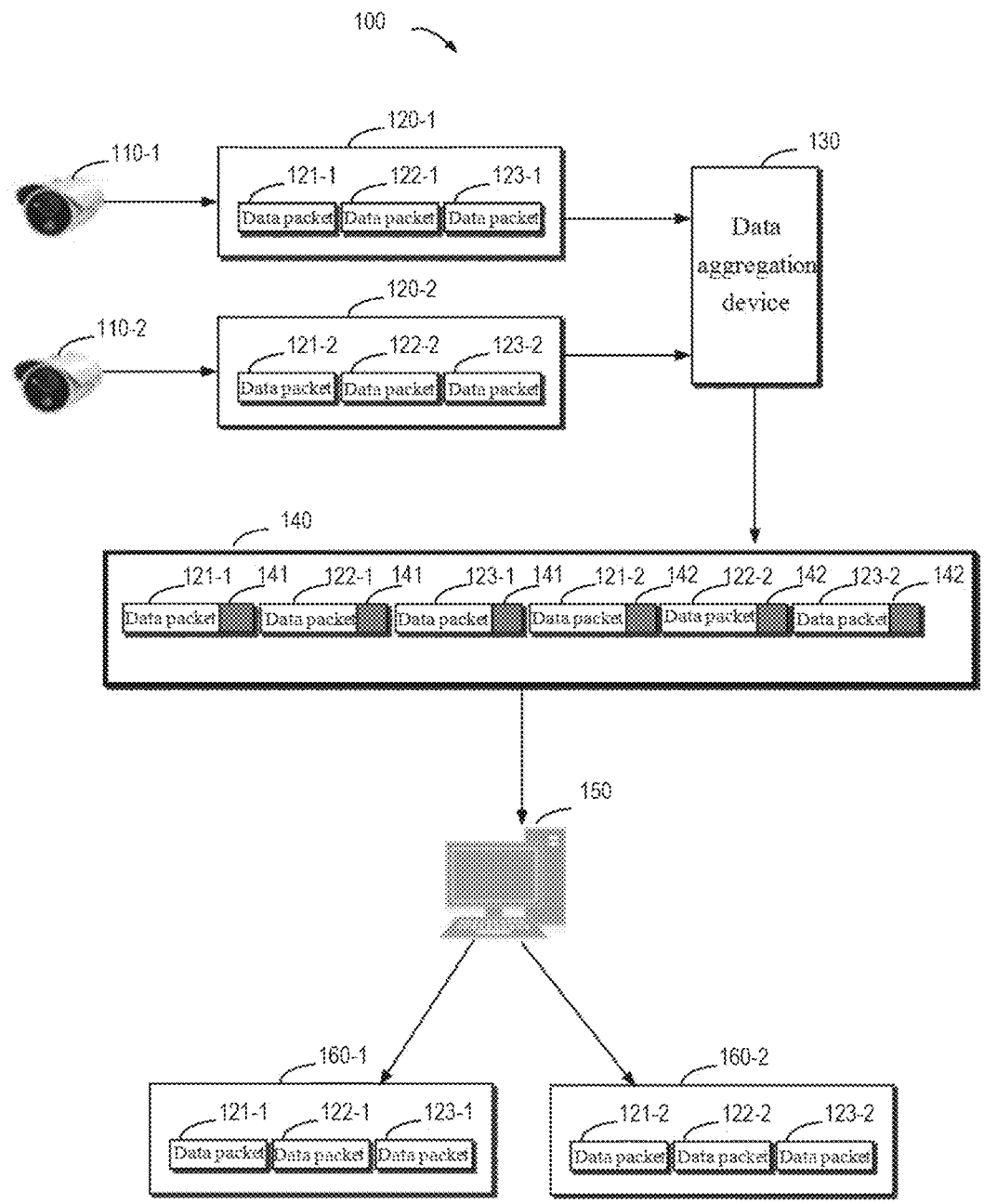
FIG. 1 shows a schematic diagram of an example environment in which multiple embodiments of the present disclosure can be implemented.

Embodiments of the present disclosure will be described in more detail with reference to the accompanying drawings below. Although some embodiments of the present disclosure are shown in the accompanying drawings, it should be understood that the present disclosure can be implemented in various forms and should not be construed as being limited to the embodiments set forth herein. On the contrary, these embodiments are provided for a more thorough and complete understanding of the present disclosure. It should be understood that the accompanying drawings and embodiments of the present disclosure are only used for illustrative purposes, and are not used to limit the protection scope of the present disclosure.

In the description of the embodiments of the present disclosure, the term "include" and similar terms should be understood as open-ended inclusion, namely "including but not limited to". The term "based on" should be understood as "based at least in part on". The term "an embodiment" or "the embodiment" should be understood as "at least one embodiment". The terms "first", "second" or the like may refer to different or the same objects. Other explicit and implicit definitions may also be included below.

In the description of the embodiments of the present disclosure, as understood by those skilled in the art, the term "data stream" means that data obtained from a video capture device is received by a data aggregation device in the form of streams. The data stream may include at least one data packet, and the data packet may include at least one frame of image.

In the description of the embodiments of the present disclosure, as understood by those skilled in the art, the term "aggregation" refers to the aggregation of multiple data packets of multiple data streams in a single data stream in a manner of end-to-end connection or mutual interleaving so as to realize the transmission of multiple videos via a single transmission channel.

In the description of the embodiments of the present disclosure, as understood by those skilled in the art, the term "identifier" refers to an identifier used to indicate which video capture device the data packet comes from. The identifier may be a number, a letter, a symbol or a combination of one or more of them.

Traditionally, as mentioned above, video capture and processing devices are usually not flexible enough to control multiple video capture devices, and it is difficult to start and stop individual video capture devices. In addition, as the number of the video capture devices increases, these devices often require more hardware resources to transmit multiple videos, and the synchronization accuracy between these videos is low.

According to embodiments of the present disclosure, a data processing solution is proposed for obtaining videos from multiple video capture devices. In the solution, a single aggregated data stream is received from a data aggregation device. The aggregated data stream includes multiple data packets captured by multiple video capture devices respectively, and each data packet has an identifier of the video capture device that captures the data packet. Multiple videos associated with multiple video capture devices are determined from the aggregated data stream based on the identifiers, and each video includes data packets with the same identifier. In this way, data streams from the multiple video capture devices are aggregated into a single aggregated data stream for transmission, and the single aggregated data stream can further be determined as multiple videos based on the identifiers for users to use. Therefore, by utilizing the solution of the present disclosure, the videos from the multiple video capture devices can be stably and efficiently transmitted, and meanwhile, the cost of data transmission is reduced.

Embodiments of the present disclosure will be described in detail with reference to the accompanying drawings below.

FIG. 1 shows a schematic diagram of an example environment 100 in which multiple embodiments of the present disclosure can be implemented. In the example environment 100, a data aggregation device 130 receives data streams 120-1 and 120-2 from video capture devices 110-1 and 110-2. The data stream 120-1 may include data packets 121-1, 122-1 and 123-1, and the data stream 120-2 may include data packets 121-2, 122-2 and 123-2. In some embodiments, the video capture devices may include vidicons, cameras or any other device capable of capturing videos.

The data aggregation device 130 may aggregate the data streams 120-1 and 120-2 from the video capture devices 110-1 and 110-2 into a single aggregated data stream 140. In some embodiments, the data aggregation device 130 may include a serializer or a deserializer, and may also include any other device capable of aggregating multiple data streams into a single data stream. The aggregated data stream 140 includes the data packets 121-1, 122-1, 123-1, 121-2, 122-2 and 123-2. The data packets 121-1, 122-1 and 123-1 have an identifier 141 of the video capture device 110-1, and the data packets 121-2, 122-2 and 123-2 have an identifier 142 of the video capture device 110-2 to indicate the video capture devices associated with these data packets. It should be understood that although FIG. 1 shows that these data packets are arranged in an end-to-end connection order of 121-1, 122-1, 123-1, 121-2, 122-2 and 123-2, these data packets can also be arranged in an interleaved order, for example, in an order of 121-1, 122-2, 123-1, 121-2, 122-1 and 123-2, which is not limited in the present disclosure.

Computing equipment 150 receives the aggregated data stream 140. Since the data packets 121-1, 122-1, 123-1, 121-2, 122-2 and 123-2 have the identifier 141 or 142 indicating the video capture device 110-1 or the video capture device 110-2, the computing equipment 150 can determine a video 160-1 including the data packets 121-1, 122-1 and 123-1 and a video 160-2 including the data packets 121-2, 122-2 and 123-2 from the aggregated data stream 140 according to these identifiers for users to use. The computing equipment 150 may be stationary computing equipment, such as a server, a desktop computer and a development board, or a portable computing equipment, such as a mobile phone and a tablet computer. It should be understood that only some examples of the computing equipment 150 are described above, and the computing equipment may also be other appropriate systems such as a distributed computing system or equipment.

It should be understood that the environment shown in FIG. 1 is only as an example. Although FIG. 1 only shows that the data aggregation device 130 receives the data streams from the two video capture devices 110-1 and 110-2, it should be understood that the data aggregation device 130 may also receive data streams from more video capture devices, or may also aggregate more data streams into a single aggregated data stream. It should also be understood that multiple data aggregation devices may be used to receive data streams from multiple video capture devices, and multiple pieces of computing equipment may also be used to determine multiple videos, which is not limited in the present disclosure.

Figure 2:
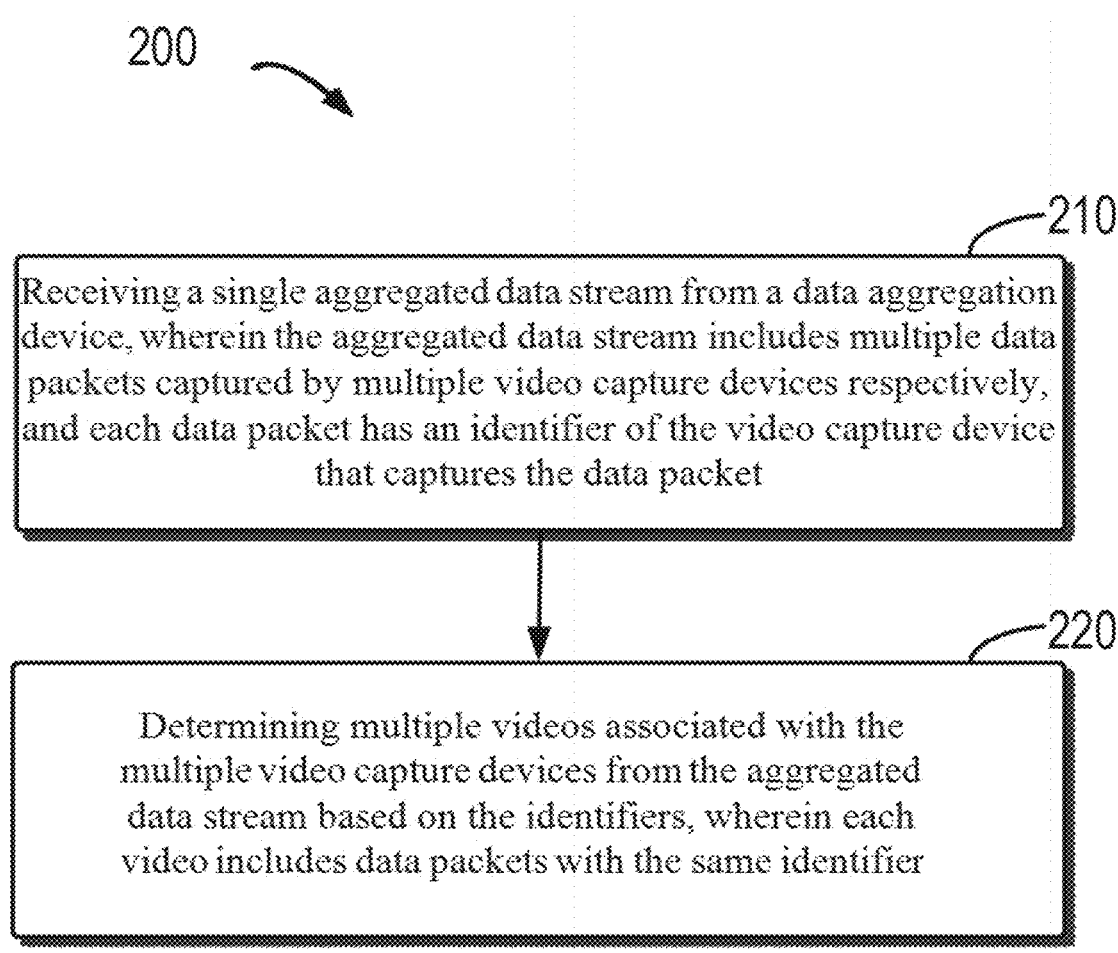
FIG. 2 shows a flowchart of a data processing process according to an embodiment of the present disclosure.

In order to understand the data processing solution provided by the embodiments of the present disclosure more clearly, the embodiments of the present disclosure will be further described with reference to FIG. 2. FIG. 2 shows a flowchart of a data processing process 200 according to an embodiment of the present disclosure. The process 200 may be implemented by the computing equipment 150 in FIG. 1 or by a distributed computing system including the computing equipment 150. To facilitate discussion, the process 200 will be described in conjunction with FIG. 1.

At block 210, the computing equipment 150 receives the single aggregated data stream 140 from the data aggregation device 130. The aggregated data stream 140 includes the data packets 121-1, 122-1, 123-1, 121-2, 122-2 and 123-2 captured by the video capture devices 110-1 and 110-2. The data packets 121-1, 122-1 and 123-1 have the identifier 141 of the video capture device 110-1, and the data packets 121-2, 122-2 and 123-2 have the identifier 142 of the video capture device 110-2. The identifiers 141 and 142 are added into each data packet when the data aggregation device 130 aggregates the data streams 120-1 and 120-2. In this way, the computing equipment 150 only needs to receive a single aggregated data stream from the data aggregation device 130 to receive data packets from multiple video capture devices, and thus hardware resources required for data packet transmission are significantly reduced.

In some embodiments, the computing equipment 150 may receive an access request of a user for at least one video capture device of the multiple video capture devices 110-1 or 110-2. In response to receiving the access request, the computing equipment 150 may send an instruction for starting the at least one video capture device to the data aggregation device 130. The data aggregation device 130 may start the at least one video capture device according to the instruction. The computing equipment 150 may receive the aggregated data stream 140 from the data aggregation device 130, and the aggregated data stream 140 at least includes the data packets captured by the at least one video capture device. In this way, the user can start an individual video capture device in a targeted manner as needed, so that the overall device power consumption is lowered.

At block 220, the computing equipment 150 determines the videos 160-1 and 160-2 associated with the video capture devices 110-1 and 110-2 from the aggregated data stream 140 based on the identifiers 141 and 142. The video 160-1 includes the data packets 121-1, 122-1 and 123-1, and the video 160-2 includes the data packets 121-2, 122-2 and 123-2. In this way, the computing equipment 150 may determine the received single aggregated data stream 140 as the videos captured from the video capture devices 110-1 and 110-2 respectively, thus the data transmission efficiency is improved, and the consumption of transmission resources is lowered.

In some embodiments, the computing equipment 150 may determine the identifiers 141 and 142 of the data packets 121-1, 122-1, 123-1, 121-2, 122-2 and 123-2 included in the aggregated data stream 140. The computing equipment 150 determines the data packets 121-1, 122-1 and 123-1 having the identifier 141 as a first data set, and determines the data packets 121-2, 122-2 and 123-2 having the same identifier 142 as a second data set. In this way, the computing equipment 150 may quickly determine the first data set from the first video capture device 110-1 and the second data set from the second video capture device 110-2 so as to improve the video obtaining efficiency. In some embodiments, the computing equipment 150 may determine the video 160-1 from the first video capture device 110-1 and the video 160-2 from the second video capture device 110-2 based on the first data set and the second data set respectively. In this way, the computing equipment 150 may obtain videos from the multiple video capture devices from the aggregated data stream 140 by utilizing the identifiers, so that the data transmission process is simplified.

In some embodiments, after the computing equipment 150 receives an access request for at least one video of the videos 160-1 and 160-2, the computing equipment 150 may obtain the identifier of the at least one video from the access request. According to the identifier, the computing equipment 150 may provide the user with the video matched with the identifier for the user to use. For example, if the user currently needs to obtain the video 160-1, the user may send an access request for the video 160-1 to the computing equipment 150, and the request includes the identifier 141. The computing equipment 150 may obtain the identifier 141 from the access request. In some embodiments, the computing equipment 150 may provide the user with the video 160-1 matched with the identifier 141 according to the identifier 141 for the user to use. In this way, the computing equipment 150 may selectively provide the user with the video required by the user, accordingly, the operating efficiency of the device is improved, and the power consumption is lowered.

Figure 3:
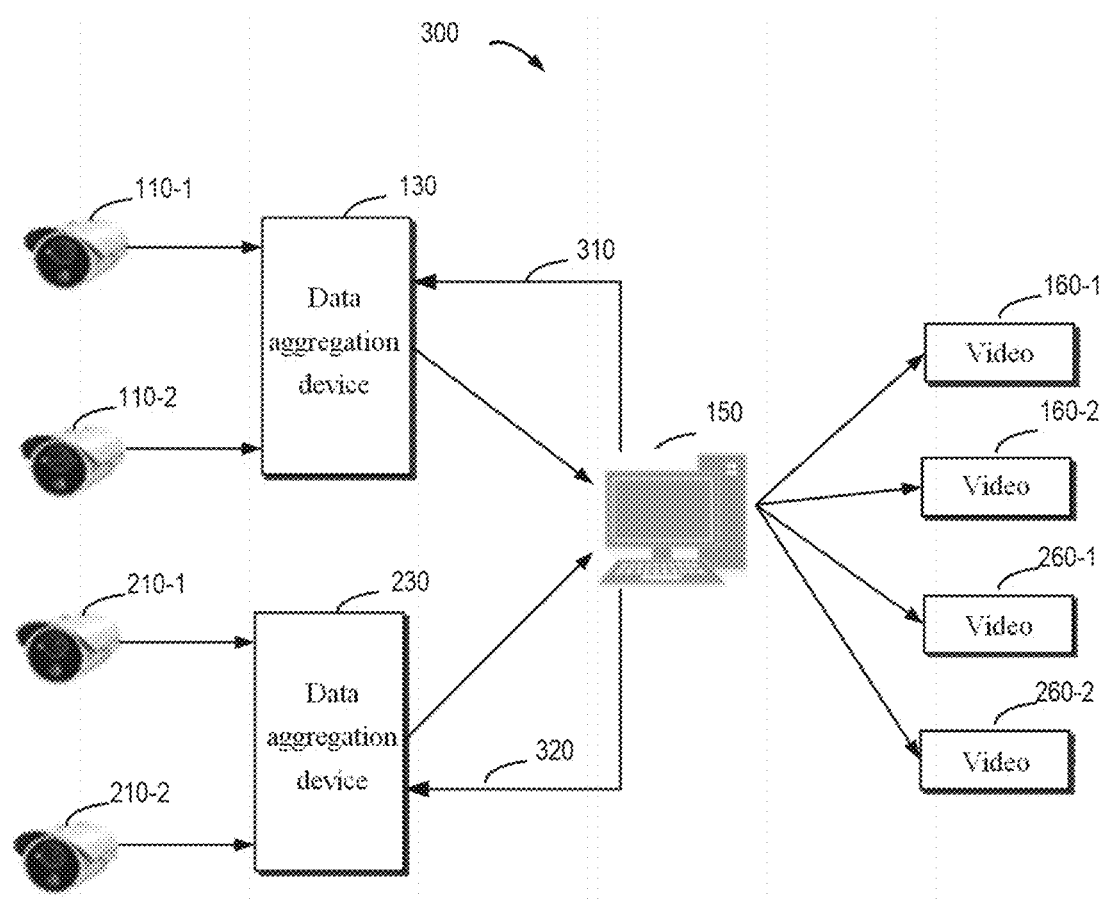
FIG. 3 shows a schematic diagram of data processing according to an embodiment of the present disclosure.

FIG. 3 shows a schematic diagram 300 of data processing according to an embodiment of the present disclosure. For the purpose of simplifying the diagram, the transmission and conversion process of data streams and data packets are not shown in FIG. 3, and those skilled in the art should understand that the transmission and conversion process of the data streams and the data packets involved in FIG. 3 is performed in the manner described in FIG. 1 and FIG. 2. In an example of FIG. 3, the computing equipment 150 may receive a single aggregated data stream from two data aggregation devices 130 and 230 respectively, and then determine videos 160-1, 160-2, 260-1 and 260-2 captured from video capture devices 110-1, 110-2, 210-1 and 210-2 from these aggregated data streams. In this way, the computing equipment 150 may obtain videos captured from more video capture devices, and thus the device applicability is expanded.

Taking FIG. 3 as an example still, the computing equipment 150 may send trigger signals 310 and 320 with a predetermined frequency to the data aggregation devices 130 and 230 respectively, wherein the trigger signals 310 and 320 have the same frequency. After receiving the trigger signals 310 and 320, the data aggregation devices 130 and 230 may synchronously obtain data packets captured by the video capture devices 110-1, 110-2, 210-1 and 210-2 at the predetermined frequency. For example, the computing equipment 150 synchronously sends 25 Hz trigger signals 310 and 320 to the data aggregation devices 130 and 230, and the data aggregation devices 130 and 230 can synchronously obtain the data packets from the video capture devices 110-1, 110-2, 210-1 and 210-2 at 40 millisecond intervals. Since the trigger signals 310 and 320 are synchronously sent to the data aggregation devices 130 and 230, the data packets are also synchronously obtained from the video capture devices 110-1, 110-2, 210-1 and 210-2, and finally the videos 160-1, 160-2, 260-1 and 260-2 are synchronously obtained as well. In this way, the synchronization accuracy of the videos obtained from the multiple video capture devices can be increased.

It should be understood that although four video capture devices and two data aggregation devices are shown in FIG. 3, more video capture devices and data aggregation devices may be arranged according to actual needs. It should also be understood that although only one computing equipment 150 is shown in FIG. 3 to receive the aggregated data streams from the data aggregation devices 130 and 230 respectively, additional computing equipment may be further arranged to receive the aggregated data streams from the data aggregation devices 130 and 230. The additional computing equipment may also be used to obtain the videos

160-1, 160-2, 260-1 and 260-2. In this way, the required videos may be obtained on different pieces of computing equipment, so that a user can perform various processing on the videos independently.

Generally, when a user processes an image, the obtained image often encounters the problem of image frame cutting because the processing speed of a frame of image by a processor is lower than the speed of a frame of image being stored in a buffer. For example, after a frame of image is stored in the buffer, the processor processes the frame of image, but due to some reasons, the processor is slower to process the frame of image, resulting in that the frame of image in the buffer is covered by the next frame of image before being processed, then part of an image obtained by the user is displayed as the previous frame of image, and the other part is displayed as the next frame of image, which reduces the quality of image processing and greatly affects the user experience.

In some embodiments, the computing equipment 150 may allocate n low-level buffers for each video, wherein n is an integer greater than or equal to 2. When the user needs to process the videos, each frame in the video can be circularly stored in the low-level buffers in sequence. For example, taking n=3 as an example, the computing equipment 150 may store a first frame of image in the video in a first buffer, store a second frame of image in a second buffer, and store a third frame of image in a third buffer, then return to the first buffer, store a fourth frame of image in the first buffer, store a fifth frame of image in the second buffer, and so on. The computing equipment 150 then allocates a temporary buffer for reading a frame of image currently to be processed from the low-level buffer to the temporary buffer for processing by the computing equipment 150.

For example, when processing the first frame of image, the computing equipment 150 firstly reads the first frame of image from the first buffer to the temporary buffer, and processes the frame of image in the temporary buffer. Assuming that the time interval for the computing equipment 150 to store one frame in the lower-level buffer is T, after the first frame of image is stored in the first buffer, the second frame of image is stored in the second buffer after the time T has elapsed, the third frame of image is stored in the third buffer after another time T has elapsed, the fourth frame of image is stored in the first buffer after still another time T has elapsed, and then the fifth frame image is stored in the second buffer after yet another time T has elapsed. It can be seen that since the second frame of image, the third frame of image and the fourth frame of image are stored in the second, third and first buffers respectively, they will not have any impact on the image being processed in the temporary buffer, as long as it is ensured that when the computing equipment 150 reads the second frame of image from the second buffer after processing the first frame of image, the second frame of image is not covered by the fifth frame of image. Therefore, as long as the image processing speed of the computing equipment 150 is lower than (n+1)*T, the abnormal situations can be avoided. In this way, according to actual needs, by adjusting the number of the low-level buffers allocated to the videos, the problems of image frame cutting and frame loss can be effectively avoided, and the quality of image processing is improved.

Figure 4:
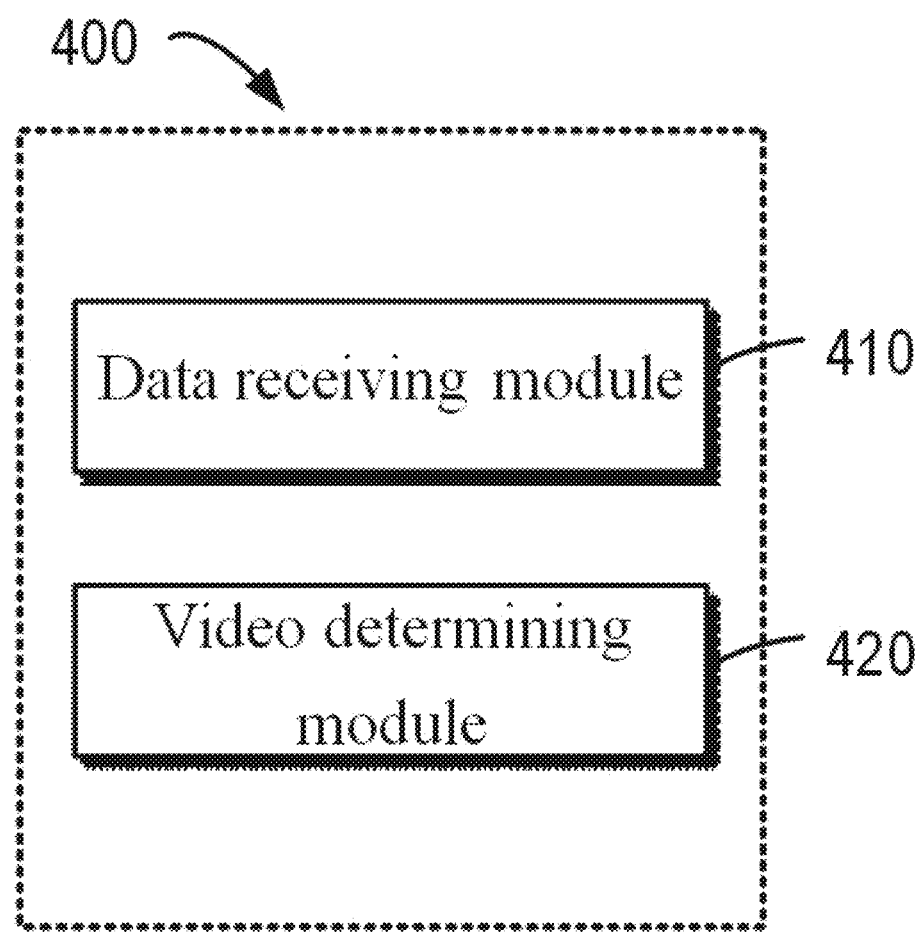
FIG. 4 shows a schematic block diagram of a data processing device according to an embodiment of the present disclosure.

FIG. 4 shows a schematic block diagram of a device 400 for data processing according to an embodiment of the present disclosure. The device 400 may be included in the computing equipment 150 of FIG. 1 or implemented as the computing equipment 150. As shown in FIG. 4, the device 400 includes a data receiving module 410 configured to receive a single aggregated data stream from a data aggregation device, the aggregated data stream includes multiple data packets captured by multiple video capture devices respectively, and each data packet has an identifier of the video capture device that captures the data packet. The device 400 further includes a video determining module 420 configured to determine multiple videos associated with the multiple video capture devices from the aggregated data stream based on the identifiers, and each video includes data packets with the same identifier.

In some embodiments, the data receiving module 410 includes: an instruction sending module configured to, in response to receiving an access request for at least one video capture device of the multiple video capture devices, send an instruction for starting the at least one video capture device to the data aggregation device; and a data stream receiving module configured to receive a single aggregated data stream from the data aggregation device, and the single aggregated data stream at least includes data packets captured by the at least one video capture device.

In some embodiments, the video determining module 420 includes: an identifier determining module configured to determine the respective identifiers of the multiple data packets included in the aggregated data stream; a data set determining module configured to determine the data packets with the same identifier among the multiple data packets as a data set; and an identifier utilization module configured to determine the video associated with the video capture device corresponding to the identifier based on the data set.

In some embodiments, the device 400 further includes a trigger module configured to simultaneously send a trigger signal with a predetermined frequency to the data aggregation device and another data aggregation device, so that the data aggregation device and the another data aggregation device synchronously obtain the data packets captured by different video capture devices at the predetermined frequency.

In some embodiments, the device 400 further includes: an identifier obtaining module configured to, in response to receiving an access request for at least one video of the multiple videos, obtain an identifier of the at least one video from the access request; and a video providing module configured to provide a video matched with the obtained identifier among the multiple videos.

In some embodiments, the data aggregation device 130 includes a serializer and a deserializer.

Figure 5:
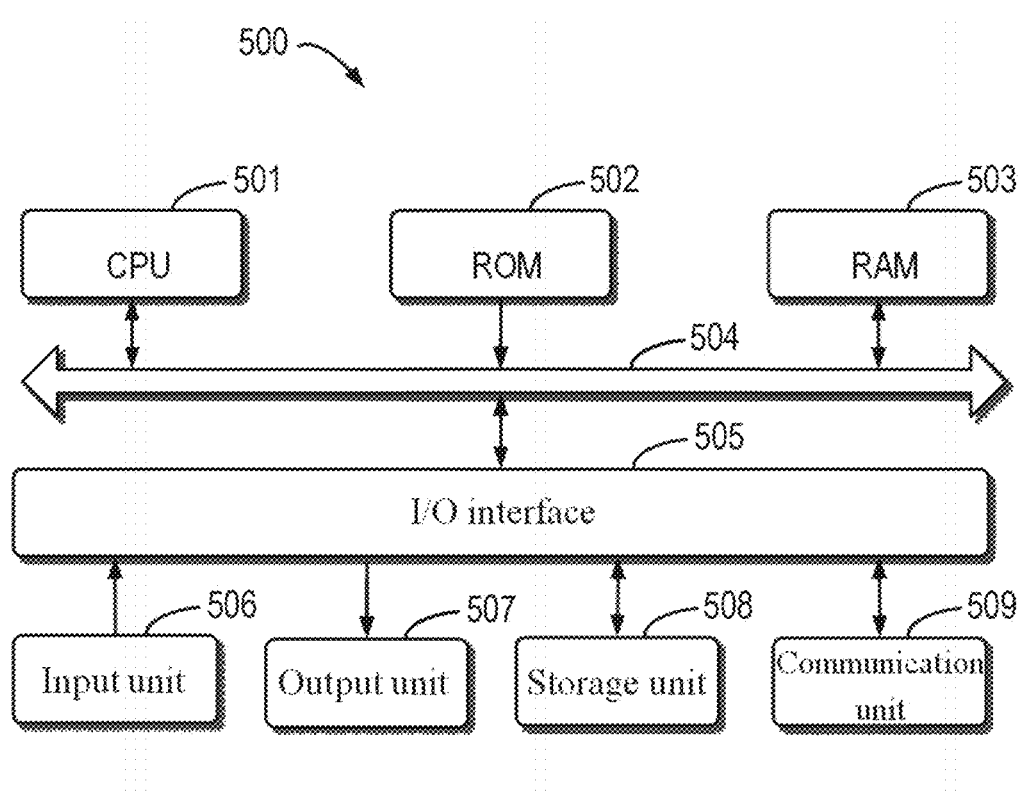
FIG. 5 shows a block diagram of computing equipment capable of implementing multiple embodiments of the present disclosure.

FIG. 5 shows a schematic block diagram of example equipment 500 that can be used to implement the embodiments of the present disclosure. The equipment 500 may be used to implement the computing equipment 150 of FIG. 1. As shown in the figure, the equipment 500 includes a central processing unit (CPU) 501 which can perform various appropriate actions and processing according to computer program instructions stored in a read-only memory (ROM) 502 or computer program instructions loaded from a storage unit 508 to a random access memory (RAM) 503. Various programs and data desired for the operation of the equipment 500 can further be stored in the RAM 503. The CPU 501, the ROM 502 and the RAM 503 are connected to each other through a bus 504. An input/output (I/O) interface 505 is also connected to the bus 504.

Multiple components in the equipment 500 are connected to the I/O interface 505, including: an input unit 506, such as a keyboard and a mouse; an output unit 507, such as various types of displays and loudspeakers; a storage unit 508, such as a magnetic disk and an optical disk; and a communication unit 509, such as a network card, a modem and a wireless communication transceiver. The communication unit 509 allows the equipment 500 to exchange information/data with other equipment through a computer network such as the Internet and/or various telecommunication networks.

The processing unit 501 executes the various methods and processing described above, such as the process 200. For example, in some embodiments, the process 200 may be implemented as a computer software program which is tangibly contained in a machine-readable medium, such as the storage unit 508. In some embodiments, part or all of the computer programs may be loaded and/or installed on the equipment 500 via the ROM 502 and/or the communication unit 509. When the computer program is loaded to the RAM 503 and executed by the CPU 501, one or more steps of any one of the processes 200 described above can be executed. Alternatively, in other embodiments, the CPU 501 may be configured to execute the process 200 in any other suitable manner (for example, by means of firmware).

The functions described above may be performed at least in part by one or more hardware logic components. For example, types of hardware logic components that can be used include, but are not limited to: a field programmable gate array (FPGA), an application specific integrated circuit (ASIC), an application specific standard product (ASSP), a system on chip system (SOC), a load programmable logic device (CPLD), etc.

Program codes used to implement the method of the present disclosure may be written in any combination of one or more programming languages. These program codes may be provided to processors or controllers of general-purpose computers, special-purpose computers or other programmable data processing devices, so that when the program codes are executed by the processors or controllers, the functions/operations specified in the flowcharts and/or block diagrams are implemented. The programs code can be executed entirely on a machine, partly executed on the machine, partly executed on the machine and partly executed on a remote machine as an independent software package, or entirely executed on the remote machine or server.

In the context of the present disclosure, a machine-readable medium may be a tangible medium, which may contain or store a program for use by an instruction execution system, device or equipment or a program used in combination with an instruction execution system, device or equipment. The machine-readable medium may be a machine-readable signal medium or a machine-readable storage medium. The machine-readable medium may include, but is not limited to, an electronic, magnetic, optical, electromagnetic, infrared or semiconductor system, device or equipment, or any suitable combination of the foregoing. More specific examples of machine-readable storage media would include electrical connectors based on one or more wires, portable computer disks, hard disks, random access memories (RAM), read-only memories (ROM), erasable programmable read-only memories (EPROM or flash memories), optical fibers, portable compact disk read-only memories (CD-ROM), optical storage equipment, magnetic storage equipment or any suitable combination of the foregoing.

In addition, although the operations are depicted in a specific order, it should be understood that such operations may be performed in the shown specific order or in a sequential order, or that all operations shown in the figures should be performed, so as to achieve desired results. Under certain circumstances, multitasking and parallel processing may be advantageous. Likewise, although several specific implementation details are included in the above discussion, these should not be construed as limiting the scope of the present disclosure. Certain features that are described in the context of separate embodiments may also be implemented in combination in a single implementation. Conversely, various features that are described in the context of the single implementation can also be implemented in multiple implementations individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely forms of implementing the claims by way of example.

The invention claimed is:

1. A computer-implemented method for data processing, the method comprising:
    simultaneously sending a trigger signal having a predetermined frequency to a data aggregation device and another data aggregation device so that the data aggregation device and the another data aggregation device synchronously obtain data packets captured by different video capture devices at the predetermined frequency;
    receiving, by computer equipment, a single aggregated data stream from the data aggregation device and the another data aggregation device, wherein the single aggregated data stream includes multiple data packets captured by corresponding multiple video capture devices respectively, and wherein each data packet has an identifier of the video capture device that captured the data packet;
    determining, by computer equipment, multiple videos associated with the corresponding multiple video capture devices from the single aggregated data stream based on the identifiers, wherein each video includes data packets with the same identifier;
    allocating n low-level buffers and a temporary buffer for each of the multiple videos, wherein n is an integer greater than or equal to 2; and
    cyclically storing, when a respective video of the multiple videos is processed, each frame in the respective video into each of the corresponding low-level buffers in sequence, and reading the frame to be processed from the corresponding low-level buffer to the corresponding temporary buffer for processing, wherein n is selected so that $(n+1)*T$ is larger than the speed for processing the frame, T being a time interval for storing each frame in the respective video into each of the corresponding low-level buffers.

2. The method according to claim 1, wherein receiving the single aggregated data stream from the data aggregation device comprises:
    in response to receiving an access request for at least one video capture device of the multiple video capture devices, sending an instruction for starting the at least one video capture device to the data aggregation device; and
    receiving the single aggregated data stream from the data aggregation device, wherein the single aggregated data stream at least includes data packets captured by the at least one video capture device.

3. The method according to claim 1, wherein determining the multiple videos from the aggregated data stream comprises:
    determining the identifier of each of the multiple data packets included in the single aggregated data stream;
    determining one or more data packets with the same identifier among the multiple data packets as a data set; and
    determining a video associated with the video capture device corresponding to the identifier based on the data set.

4. The method according to claim 1, further comprising:
    in response to receiving an access request for at least one video of the multiple videos, obtaining an identifier of the at least one video from the access request; and
    providing at least one video matched with the obtained identifier among the multiple videos.

5. The method according to claim 1, wherein the data aggregation device comprises a serializer and a deserializer.

6. Electronic equipment, comprising:
    one or more processors; and
    a storage device storing one or more programs configured to be executed by the one or more processors, the one or more programs including instructions for causing the electronic equipment to perform operations comprising:
    simultaneously sending a trigger signal having a predetermined frequency to a data aggregation device and another data aggregation device so that the data aggregation device and the another data aggregation device synchronously obtain data packets captured by different video capture devices at the predetermined frequency;
    receiving a single aggregated data stream from the data aggregation device and the another data aggregation device, wherein the single aggregated data stream includes multiple data packets captured by corresponding multiple video capture devices respectively, and wherein each data packet has an identifier of the video capture device that captured the data packet;
    determining multiple videos associated with the corresponding multiple video capture devices from the single aggregated data stream based on the identifiers, wherein each video includes data packets with the same identifier;
    allocating n low-level buffers and a temporary buffer for each of the multiple videos, wherein n is an integer greater than or equal to 2; and
    cyclically storing, when a respective video of the multiple videos is processed, each frame in the respective video into each of the corresponding low-level buffers in sequence, and reading the frame to be processed from the corresponding low-level buffer to the corresponding temporary buffer for processing, wherein n is selected so that $(n+1)*T$ is larger than the speed for processing the frame, T being a time interval for storing each frame in the respective video into each of the corresponding low-level buffers.

7. The electronic equipment according to claim 6, wherein receiving the single aggregated data stream from the data aggregation device comprises:
    in response to receiving an access request for at least one video capture device of the multiple video capture devices, sending an instruction for starting the at least one video capture device to the data aggregation device; and
    receiving the single aggregated data stream from the data aggregation device, wherein the single aggregated data stream at least includes data packets captured by the at least one video capture device.

8. The electronic equipment according to claim 6, wherein determining the multiple videos from the aggregated data stream comprises:
    determining the identifier of each of the multiple data packets included in the single aggregated data stream;
    determining one or more data packets with the same identifier among the multiple data packets as a data set; and
    determining a video associated with the video capture device corresponding to the identifier based on the data set.

9. The electronic equipment according to claim 6, further comprising:
    in response to receiving an access request for at least one video of the multiple videos, obtaining an identifier of the at least one video from the access request; and
    providing at least one video matched with the obtained identifier among the multiple videos.

10. The electronic equipment according to claim 6, wherein the data aggregation device comprises a serializer and a deserializer.

11. A non-transitory computer-readable storage medium that stores one or more programs comprising instructions that, when executed by one or more processors of electronic equipment, cause the electronic equipment to implement operations comprising:
    simultaneously sending a trigger signal having a predetermined frequency to a data aggregation device and another data aggregation device so that the data aggregation device and the another data aggregation device synchronously obtain data packets captured by different video capture devices at the predetermined frequency;
    receiving a single aggregated data stream from the data aggregation device and the another data aggregation device, wherein the single aggregated data stream includes multiple data packets captured by corresponding multiple video capture devices respectively, and wherein each data packet has an identifier of the video capture device that captured the data packet;
    determining multiple videos associated with the corresponding multiple video capture devices from the single aggregated data stream based on the identifiers, wherein each video includes data packets with the same identifier;
    allocating n low-level buffers and a temporary buffer for each of the multiple videos, wherein n is an integer greater than or equal to 2; and
    cyclically storing, when a respective video of the multiple videos is processed, each frame in the respective video into each of the corresponding low-level buffers in sequence, and reading the frame to be processed from the corresponding low-level buffer to the corresponding temporary buffer for processing, wherein n is selected so that $(n+1)*T$ is larger than the speed for processing the frame, T being a time interval for storing each frame in the respective video into each of the corresponding low-level buffers.

12. The non-transitory computer-readable storage medium according to claim 11, wherein receiving the single aggregated data stream from the data aggregation device comprises:

in response to receiving an access request for at least one video capture device of the multiple video capture devices, sending an instruction for starting the at least one video capture device to the data aggregation device; and receiving the single aggregated data stream from the data aggregation device, wherein the single aggregated data stream at least includes data packets captured by the at least one video capture device.

13. The non-transitory computer-readable storage medium according to claim 11, wherein determining the multiple videos from the aggregated data stream comprises:

determining the identifier of each of the multiple data packets included in the aggregated data stream;

determining one or more data packets with the same identifier among the multiple data packets as a data set; and determining a video associated with the video capture device corresponding to the identifier based on the data set.

14. The non-transitory computer-readable storage medium according to claim 11, further comprising:

in response to receiving an access request for at least one video of the multiple videos, obtaining an identifier of the at least one video from the access request; and providing at least one video matched with the obtained identifier among the multiple videos.

15. The non-transitory computer-readable storage medium according to claim 11, wherein the data aggregation device comprises a serializer and a deserializer.

* * * * *